(12) United States Patent
Habeck et al.

(10) Patent No.: US 8,789,188 B2
(45) Date of Patent: Jul. 22, 2014

(54) METHOD AND APPARATUS FOR AUTOMATIC DETERMINATION OF AUTHORIZATION REQUIREMENTS WHILE EDITING OR GENERATING CODE

(75) Inventors: Ted A. Habeck, Fishkill, NY (US); Lawrence Koved, Pleasantville, NY (US); Jeff McAffer, Ontario (CA); Marco Pistoia, Amawalk, NY (US)

(73) Assignee: International Business Machines Corporation, Armonk, NY (US)

( * ) Notice: Subject to any disclaimer, the term of this patent is extended or adjusted under 35 U.S.C. 154(b) by 891 days.

(21) Appl. No.: 11/867,792

(22) Filed: Oct. 5, 2007

(65) Prior Publication Data
US 2009/0094667 A1    Apr. 9, 2009

(51) Int. Cl.
*G06F 21/00*    (2013.01)
(52) U.S. Cl.
USPC .................. 726/25; 726/1; 726/22; 713/167
(58) Field of Classification Search
None
See application file for complete search history.

(56) References Cited

U.S. PATENT DOCUMENTS

| | | | |
|---|---|---|---|
| 7,076,804 B2 | 7/2006 | Kershenbaum et al. | |
| 7,203,833 B1 * | 4/2007 | Abadi et al. | 713/167 |
| 2003/0084324 A1 | 5/2003 | Koved et al. | |
| 2005/0055565 A1 * | 3/2005 | Fournet et al. | 713/200 |
| 2005/0246773 A1 * | 11/2005 | Draine et al. | 726/22 |

OTHER PUBLICATIONS

Salamat et al, Runtime Defense against Code Injection Attacks Using Replicated Execution, Aug. 2011, IEEE, 588-601.*
Gruian et al, BlueJEP: A Flexible and High-Performance Java Embedded Processor, 2007, 222-229.*
Larry Koved, Marco Pistoia, Aaron Kershen Baum, Access Rights Analysis for Java, OOPSLA '02, Nov. 4-8, 2002, Seattle, Washington, USA.
OOPSLA 2002 Advance Program Technical Program, Session A, Nov. 8, 2002.

* cited by examiner

*Primary Examiner* — Bradley Holder
*Assistant Examiner* — Brian Olion
(74) *Attorney, Agent, or Firm* — George Willingham; August Law, LLC (57) ABSTRACT

Systems and methods are presented for automatically determining the security requirements of program code during the creation or modification of that program code and for presenting the necessary security permissions to a developer of the program code at the time of the creation or modification of the program code. A cache is established containing program code segments including library calls and application program interfaces that require security permissions at runtime. The cache also includes the security permissions associated with the stored program code segments. Program code editing is monitored in real time during the editing, and instances of edits that add, modify or delete the stored program code segments from the program code being edited are identified. The security permissions associated with the program code segments that are modified by the edits are retrieved from the cache. The retrieved security permissions are immediately presented to the developer in an interactive format that provides the developer with the ability to accept or decline the necessary changes to the security permissions.

21 Claims, 3 Drawing Sheets

METHOD AND APPARATUS FOR AUTOMATIC DETERMINATION OF AUTHORIZATION REQUIREMENTS WHILE EDITING OR GENERATING CODE

FIELD OF THE INVENTION

The present invention relates to computer security architectures.

BACKGROUND OF THE INVENTION

Run-time environments in which access control is based on stack inspection require that, when access to a protected resource is attempted at run time, all the callers on the call stack be granted the rights, or permissions, necessary to access that resource. Typically, permissions can be granted directly to the code accessing the resource, to the user executing that code or to both. A major challenge for code developers is the identification of the permissions their code will need at run time. Typically, the software developer writes the code and then determines the permissions needed by testing the code either dynamically or statically. The permissions that are not in the security policy associated with the code are observed. An absence of these permissions prevents successful execution of the program.

Test systems require a thorough or complete set of tests cases to provide the most accurate observation of the required permissions. A lack of a complete set of test cases causes permission requirements to be missed during testing. The consequence of missed permission requirements is system failure or unintended results at run time due to insufficient permissions being associated with the code. In order to avoid run-time authorization failures that can result from missing one or two permission requirements, a developer may recommend an overly broad set of permissions. Overly broad security permissions, however, violate security best practices such as the principle of least privilege and can result in security vulnerabilities.

As an alternative approach to dynamic testing procedures that require a large number of test cases to insure accuracy, static testing of the code can be used after the code has been written to determine what permissions are required. Even static analysis, however, can fail to recognize or uncover all of the permissions required by the code. Static analysis methods have been developed to increase the accuracy or completeness of the test. For example, in U.S. Pat. No. 7,076,804 a method is disclosed for conducting static analysis by using program graphs that represent the code being test. Permissions are associated with nodes within the graph, and the graph can be used to determine the permissions requirement by the code based on different execution scenarios. In U.S. patent publication no. 2003/0084324 a method is disclosed that utilizes object inheritance to assign permissions to code. The permissions are arranged in a hierarchy of classes and subclasses, and entire classes of permissions are assigned to the code.

Static analysis methods, however, still have shortcomings. In particular, in order to be precise, static analysis tools typically require several minutes, hours, or longer generating a complete permission analysis. Software developers, however, prefer to immediately know the authorization requirements of the code while they are creating or editing it. For example, an unexpected permission requirement in the code may reveal an unanticipated security problem in the code. Detecting that security problem right away allows for immediate code modification before permission requirements for other components are affected. For library code, some permission requirements should stay confined within the library code without propagating to clients of the library. For this to happen, the security-sensitive actions responsible for those permission requirements must be wrapped in a special language construct and made "privileged". Detecting permission requirements during code creation affords the developer the ability to decide whether or not the security-sensitive action responsible for a permission requirement should be made privileged. In addition, explanations of why a specific permission is required can be useful for the developer as well as recommendations regarding a set of possible actions, e.g., code changes and security policy changes, that can be taken while editing the code.

SUMMARY OF THE INVENTION

The present invention is directed to systems and methods for associating security permissions with program code. A cache containing a plurality of computer executable code segments and a plurality of security permissions is created. Each security permission is associated with at least one of the plurality of computer executable code segments. Creation of the cache can be accomplished using a static analysis tool or a dynamic analysis tool on each one of the plurality of computer executable code segments to determine required security permissions associated with the computer executable code segments. In one embodiment, creation of the cache includes identifying code libraries utilized by the edited computer program code, identifying library entries within the identified libraries that require security permissions and identifying library entry points associated with the identified library entries that require security permissions. The computer executable code segments contain the library entry points. In one embodiment, the library entry points include calls to the library entries or application program interfaces. In one embodiment, the code libraries include statically linked libraries, dynamically linked libraries and combinations thereof. The cache can be persistent storage or non-persistent storage.

Having created the cache of code segments and associated permissions, edits to a computer program code involving one of the computer executable code segments contained in the cache are identified, for example in real time during the editing. In one embodiment, all monitored edits involving one of the computer executable code segments contained in the cache are identified. Identification of the edits to the computer program code involving one of the computer executable code segments includes identifying an addition of one of the computer executable code segments to the computer program code, identifying a modification of an existing computer executable code segment in the computer program code and identifying a deletion of a computer executable code segment from the computer program code.

When edits involving the program code segments are identified, security permissions associated with the edited computer executable code segment are retrieved. Either the retrieved permissions or at least one pre-defined function to apply the retrieved security permissions in accordance with the edits to the computer executable code segment are presented to the programmer or user editing the code. These functions include any suitable action for processing the retrieved permissions. In one embodiment, changes on security permission requirements caused by the identified edits involving the computer executable code segment are identified, and the pre-defined function is presented for processing the retrieved security permissions in accordance with the changes on the security permissions caused by the edits.

In one embodiment, the pre-defined functions for processing the retrieved permissions are displayed in an interactive graphical user interface. This interactive graphical user interface can include the pre-defined function and additional information associated with the pre-defined function. The additional information includes explanations regarding requirements for and effects of the presented pre-defined function. Suitable pre-defined functions include, but are not limited to, application of the retrieved permissions to a security policy associated with the computer executable code, creation of privileged code blocks in the computer executable code and suppression of the retrieved security permissions. In addition, the edited code can be made privileged. In addition to applying permissions in response to user-selected input, the retrieved security permissions can be automatically applied to the computer program code.

DETAILED DESCRIPTION

Exemplary embodiments of the present invention are directed to systems and methods for automatic determination and presentation to a software developer of the authorizations or permissions required by software code for proper operation. In particular, these permissions are determined and presented to a software developer or programmer during the development or modification of that code. As used herein, the granting of permissions includes the need for augmenting a security policy to allow a privileged operation to be performed during the execution of the code. Systems and methods in accordance with the present invention can be used with a code created in any suitable language including, but not limited to, machine language, JAVA, C, C++ and C#. In addition, the present invention can be used to check for permissions in code executed in a variety of platforms including JAVA platforms such as JAVA 2 standard edition and JAVA 2 enterprise edition and Microsoft.NET platforms. Systems and methods in accordance with the present invention can be used in distributed computing systems containing a plurality of nodes in communication across one or more networks and in a computing system containing a single computing device or server.

Figure 1:
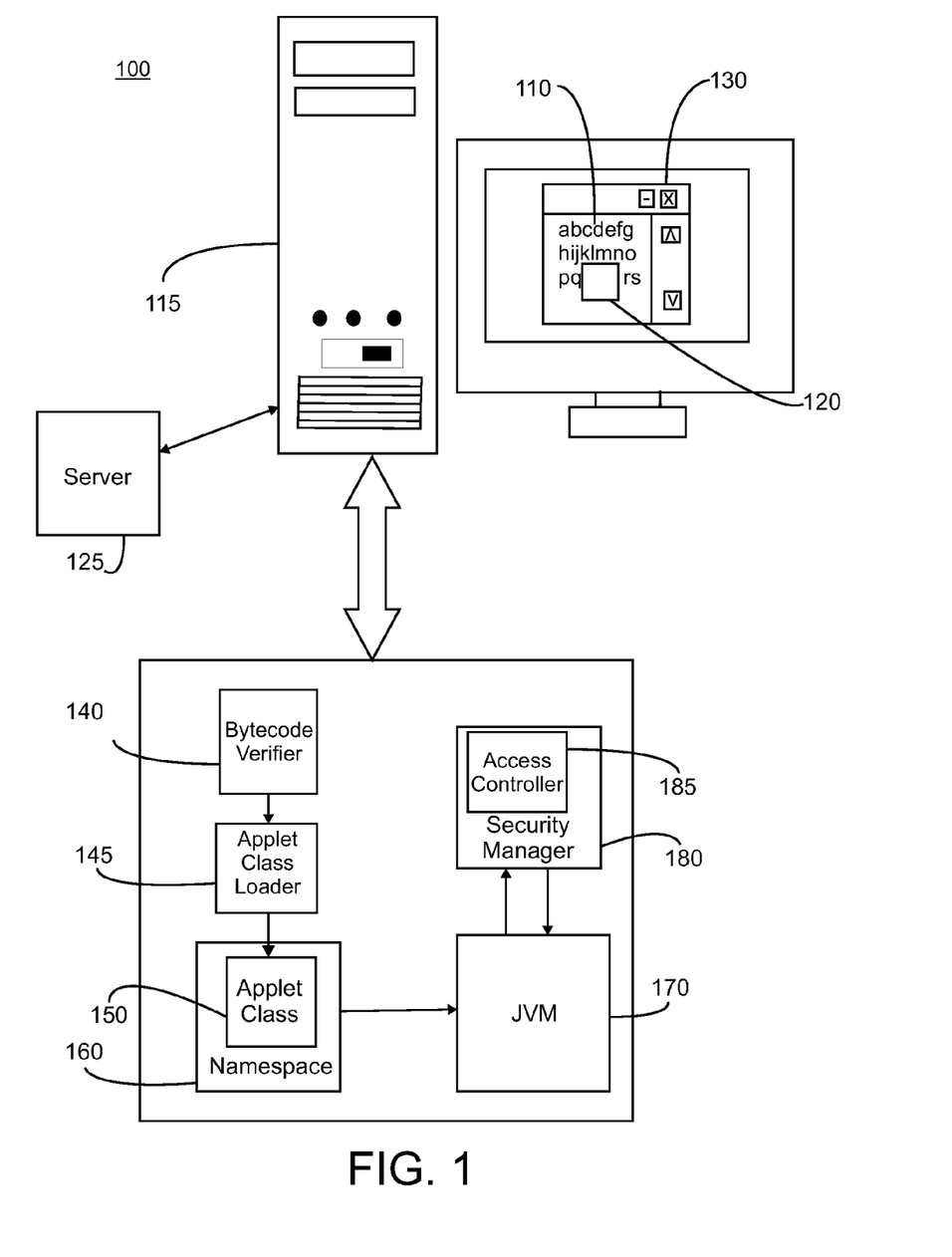
FIG. 1 is a schematic representation of a Java applet system for use with the present invention.

Referring initially to FIG. 1, an exemplary embodiment of the handling of a Java applet using a Java Virtual Machine (JVM) that implements the Java 2 Software Developer's Kit (SDK) security architecture 100 is illustrated. The use of Java applets illustrates the need for security permissions and hence the need for systems and methods in accordance with the present invention to ensure that the Java code of the applet contains the required permissions when called by a user. As illustrated, a web page 110 displayed on a suitable web browser 130 interface contains a hyperlink 120, or other suitable link, to a Java applet. When a viewer of the web browser 130 selects the Java applet hyperlink 120, or otherwise initiates the download of the Java applet, the viewer's device 115 fetches the appropriate applet code from the device or server 125 associated with the applet. The viewer's device then verifies the fetched code using a byte-code verifier 140. The applet is instantiated as a class or set of classes 150 in a namespace 160 by an applet class loader 145.

At the time the applet classes 150 are instantiated, the java virtual machine (JVM) 170 builds a protection domain for the applet. The protection domain is a data structure containing a set of permission collections. A permission collection is a grouping of permissions defined by a software developer or deployer. As used herein, a deployer refers to individuals that install and manage applications on a given hardware platform or virtual machine image. Every time a software developer defines a new permission, the software developer, or deployer also defines a permission collection to which the new permission belongs or assumes a default implementation. These permission collections may be assigned to classes 150 of the applet. Thus, when the classes are instantiated, the JVM looks at the permission collections assigned to the classes and generates a protection domain based on the assigned permission collections.

The bytecode is then executed by the JVM as threads of execution. Each thread is a stream of execution. The use of threads allows multiple streams of execution to occur virtually simultaneously in a data processing system thereby facilitating multitasking. An executing thread has a thread stack. The thread stack is a mechanism for tracking calls between methods in order to be able to return to the appropriate program location when an invoked method has finished executing.

During execution, the bytecode may make calls to potentially dangerous, or untrusted, functionality. When such a call is made by a thread of execution, the security manager 180 calls a SecurityManager.checkPermission( ) method that in turn calls an AccessController.checkPermission( ) method of the Access Controller 185.

The security manager 180, which is in communication with or alternatively a part of a JVM, enforces the security policy of the computing system on which the JVM is resident. When an untrusted operation is to be performed by an application, the security manager 180 is responsible for checking whether the application has the appropriate permission for performing the operation.

Each permission represents access to a resource of the computing system including software and data resources and hardware resources. In order for a resource access to be allowed, the corresponding permission must be explicitly granted to the code attempting the access. A permission typically has a name and, in some cases, a comma-separated list of one or more actions. For example, the following code creates a FilePermission object representing read access to the file named abc in the /tmp directory:

perm=new java.io.FilePermission("/tmp/abc","read");

In this permission, the target name is "/tmp/abc" and the action string is "read".

The above-illustrated statement creates a permission object that represents, but does not grant access to, a system resource. Permission objects are constructed and assigned, or granted, to code based on the policy in effect. When a permission object is assigned to some code, the code is granted the permission to access the protected resource specified by the current security policy and enforced by the security manager when making access to the resource. In this case, the (target) permission object is created based on the requested access, and checked against the permission objects granted to and held by the code making the request.

The security policy for an application environment is represented by a policy object. In one embodiment, the policy can be specified within one or more policy configuration files, called PolicyFile. The policy file specifies what permissions are allowed for code from specified code sources. A sample policy file entry granting code from the /home/sysadmin directory read access to the file /tmp/abc is:

```
grant codeBase "file:/home/sysadmin/" {
Permission java.io.FilePermission "/tmp/abc",
"read";
};
```

In the Java Development Kit 1.1, the SecurityManager was responsible for directly calling a check( ) method on untrusted resource access requests in order to determine if the resource access request should be granted. In Java 2 SDK, the access controller 185 calls the AccessController.checkPermission( ) method on permission objects.

When the AccessController.checkPermission( ) method is called by the access controller 185 on a permission object, the access controller 185 retrieves the AccessControlContext for a thread of execution that resulted in the call of the AccessController.checkPermission( ) method. The AccessControlContext is a combination of an array of protection domains for the classes in the thread stack and a CodeSource. The CodeSource is a combination of an origination location of a resource access request and a set of zero or more digital signatures.

Having retrieved the AccessControlContext, the access controller 185 calls an AccessControlContext.checkPermission( ) method on the AccessControlContext. The AccessControlContext.checkPermission( ) method calls an AccessControlContext.implies( ) method that in turn calls implies ( ) on each protection domain identified in the AccessControlContext to determine if the particular permission being checked is present in each of the ProtectionDomain objects. This causes an implies( ) method to be called on the java.security.Permissions object in each of the ProtectionDomains. This, in turn, causes an implies( ) method to be called on each permission in each PermissionCollection specific to that type. In this way, each permission in each relevant PermissionCollection of each ProtectionDomain identified in the AccessControlContext is checked to see if it corresponds to the permission being checked.

If the results of this check indicate that any one of the protection domains does not include the requisite permission, i.e. the permission being checked, then the requested resource access is denied. Thus, all protection domains identified by the AccessControlContext must include the permission being checked in order for the access request to be granted. This enforces the requirement that each ProtectionDomain include at least one permission collection that includes the permission being checked.

Figure 2:
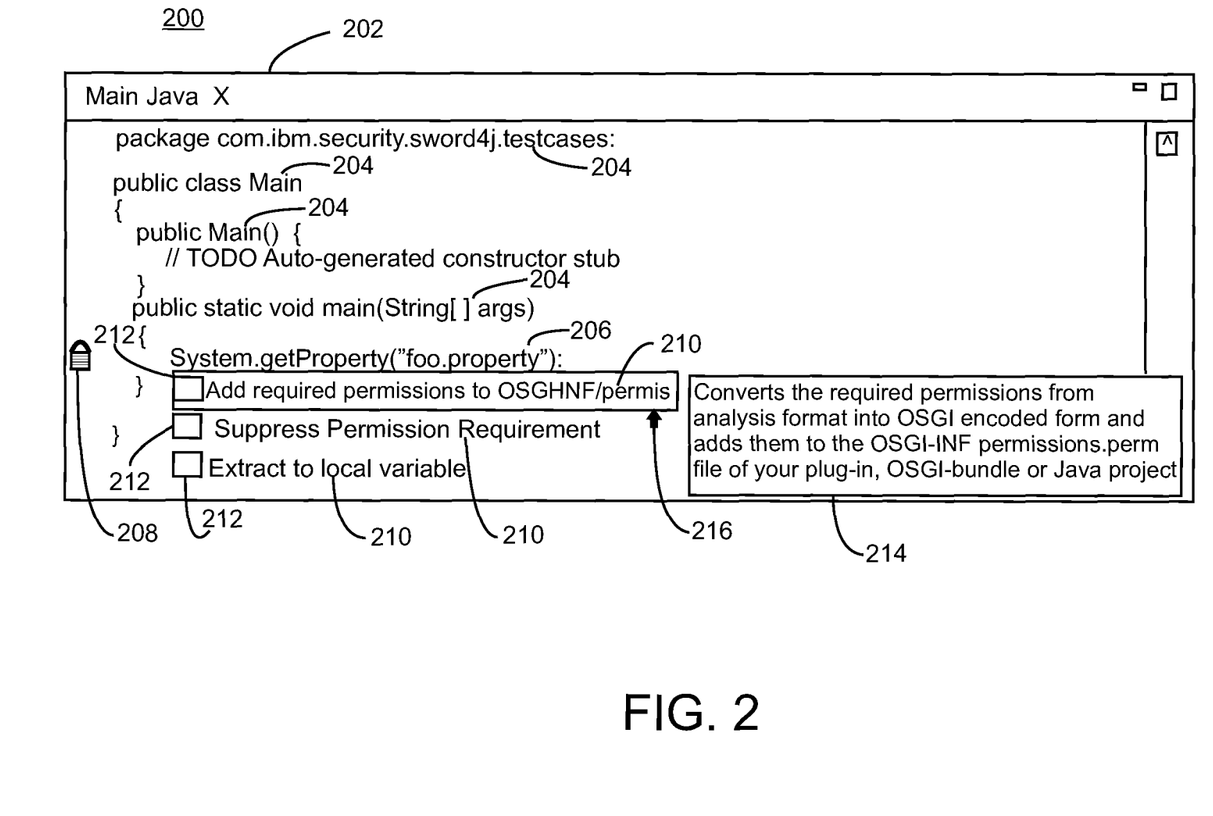
FIG. 2 is a representation of an embodiment of a permissions notification window in accordance with the present invention.

Exemplary systems and methods in accordance with the present invention determine permissions automatically while application or program code is being edited, i.e., entered, modified or deleted, by a programmer or software developer. Editing of code includes typing new source code, editing existing source code and interactively modifying the source code of a program. When developer edits to the code establish the need for one or more security permissions during execution of that code, a signal or notification is sent to the developer. Referring to FIG. 2, an exemplary embodiment of a permissions notification 200 that is presented to the developer is illustrated.

As illustrated, the permissions notification is provided in a windows-type graphical user interface (GUI) environment 202, although any suitable type of notification device can be used. The windows environment provides the generally functionality as is known and available in the art. The illustrated GUI environment is a java programming environment; however, application of methods in accordance with the present invention is not limited to java programming. The permissions notification can appear on the developer's screen within the window as illustrated in the figure. Alternatively, the developer can be provided with a visual prompt that when selected by the developer causes the illustrated permissions notification to be displayed. In general, the permissions notification is an interactive window that permits the developer to enter or select various options regarding permissions.

In one embodiment, the developer adds, deletes or modifies lines of code 204 within the editing window. When code requiring a permission 206 is entered into the source code, e.g., typing or during editing, a permissions notification 208 is displayed to the developer within the window. Therefore, the requirement for permissions are reported or presented to the developer at the time the developer is notified of the need for a permission. In one embodiment, the permissions notification 208 is an icon, e.g., a lock or other graphical or alphanumeric representation, that indicates that security permissions are required for the entered code. In addition to providing the security permission notification, the code requiring permission itself can be changed using reverse text, highlighting or a box, to provide additional visual prompting regarding the need for security permissions.

In one embodiment, the permissions notification also includes a list of at least one and preferably a plurality of pre-defined functions 210 for enacting or processing the retrieved security permissions (not shown) that are retrieved in response to the code entered by the developer. Each function in the list of pre-defined functions includes a basic description of the function and, if desired, an associated icon 212. Suitable functions include, but are not limited to, application of the retrieved permissions to a security policy associated with the computer executable code, creation of privileged code blocks in the computer executable code or suppression of the retrieved security permissions. The list of pre-defined functions can appear automatically with the notification icon 208 or can appear in response to selection of the notification icon using any suitable method of selecting icons in a GUI windows environment. In one embodiment, the retrieved permissions are also displayed. In one embodiment, mechanisms are provided for validating the permissions or functions after typing the source code. For example, the validation mechanism can include the generation of control or data flow paths to explain why the permissions are required. In one embodiment, additional information 214 including an explanation of what the particular functions do and why these functions are required is also presented to the programmer in conjunction with the required permissions. These explanations can also be displayed in the permissions notification window or can be accessed through links displayed in the permissions notification window. In one embodiment, the additional information is displayed in response to passing a windows-based pointer icon 216 over one of the functions in the list of pre-defined functions. In one embodiment, each listed function is a hyperlink to an explanation of that function and the need for the permission created by the entered code.

Other information that can be provided to the developer is the status of each listed function or underlying permission. Suitable status include whether the permission is mandatory or optional, whether the function or permission is an alternate selection for one of the other functions or permissions or whether the applicable permission is a universal permission that is applicable to other types of code. The accessible information regarding the universal permission can also explain what other code is also applicable to that universal permission.

The displayed functions provide a mechanism through which the developer can accept, modify and accepted or reject the listed permissions. In one embodiment, a select box (not shown) is provided next to each listed function. The developer selects the appropriate box or boxes next to the listed function and a button for processing the selected function to modify the code accordingly and to update the security policy accordingly, because the decision by the developer to accept or to reject the permission recommendations may require updating of the security policy. The developer can also decline to select any of the retrieved permissions and to delete the entered code that prompted the permissions notification by selecting the appropriate function. In one embodiment, the permissions notification includes a selection, i.e., function, for displaying alternative code to the code that was entered by the developer. Suitable alternative code either does not require permissions or requires permissions that have been previously attached to the code. The developer can also select to have the permissions auto applied, for example in accordance with universal rules set by the developer. The auto application of permissions can be a one-time application that is selected each time the permissions notification appears or can be selected once and applied automatically for each subsequent code entry that requires permissions. Therefore, the developer does not have to make future permission selections. In one embodiment, acceptance, modification and rejection patterns can be associated with the point in the source code program that requires the permissions, avoiding future prompting of the developer when that point in the source code is further edited or modified. In one embodiment, the developer may not be prompted to make future selections but may be notified that the code requires permissions and that these permissions have previously been applied or have been automatically or universally applied.

The illustrated permissions notification is one exemplary embodiment of providing notifications to the developer regarding suggested permissions and pre-defined functions for implementing these permissions. Any suitable type of notification mechanisms can be used that provide more information or less information to the developer than illustrated in FIG. 2. In one embodiment, the developer automatically receives suggested actions that can be automatically applied. For example, if permissions are accepted, the computed permissions are inserted in a policy database. Alternatively, the code being written is made privileged. If permissions are rejected, the code that generates these permissions requirement can be erased, alternative code can be proposed or other code is made privileged. If the code requiring permissions is removed, the corresponding permissions are removed from the policy database, the privileged code is removed or both are removed. The present invention provides the advantage of saving the developer from the burden of performing static or dynamic, i.e., runtime, analysis of the code after the code has been written. Rather, the developer can see the security requirements of the code while the code itself is being developed or modified. Exemplary embodiments of the systems and methods in accordance with the present invention allow developers to continuously monitor the security requirements of the code, to decide right away if portions of that code should be made privileged and to construct an authorization policy for running that code incrementally.

In one embodiment, a cache, e.g., a database or repository, of potential permissions associated with source code is established. In order to establish this cache of permissions, a static analysis tool, a dynamic analysis tool or a combination of both static and dynamic analysis tools are run to determine what permissions are required. In one embodiment, this analysis is used to determine what permissions are required by all the libraries against which the code, e.g., program and library, being written relies upon. In one embodiment, static analysis is used, and an open-world approach is utilized. The application programming interfaces (APIs) of the underlying libraries are used as entry points, modeling the fact that, at run time, those entry points can be called by a client application or library. If dynamic analysis is used, client test programs are written that invoke those APIs. The APIs are then tagged with the permission requirements that have been computed during the analysis, and a permission table is constructed that maps library entry points to permission requirements. In one embodiment, the permission table mapping contains variables that represent inputs to the libraries.

In one example, a library entry point requires a permission to open a file, but the file name may depend on values from the particular client code invoking the library. In this example, the authorization system is fine grained and as such guards access to different objects with different permissions. The permission object guarding the access to that particular file will be dependent on the input from the client. When a programmer invokes one of those APIs to access one or more functionalities in one of the libraries, an extensible development environment tool can look up the permissions corresponding to the invoked API. In one embodiment, fully qualifying the permission object requires computing or estimating the values of some input values to the library. In this embodiment, the development environment performs a computation of the parameters, for example using string analysis, that would further qualify the permission needed by the library and client. Therefore, some exemplary systems and methods in accordance with the present invention inform the developer of the permissions to associate with the code entered or modified by the system.

In accordance with an exemplary embodiment of associating security permissions with code in accordance with the present invention, at least one cache of permissions associated with source code is created. Suitable arrangements for the cache include, but are not limited to, any type of database or relational list that can be stored in any accessible format including both persistent and non-persistent storage. Each cache contains a plurality of different source code entries that when utilized by a software developer or programmer will trigger the need for security permissions at runtime. One or more security permissions are associated with each source code entry in each cache. Therefore, identification of the use of a given source code entry in the cache produces an identification of the required security permissions. The identified security permissions or functions for implementing or processing the identified security permissions are then displayed to the developer. In one embodiment, the developer utilizes libraries, including both statically linked libraries and dynamically linked libraries, in the editing of code. As used herein, editing of the code includes entry of new code and modification or removal of existing code. These libraries contain code or routines that can be utilized by the developer. Use of libraries in the creation of code is known and understood by one of skill in the art. Various library entries require security permissions when executed. Therefore, creation of the cache containing the correlations between code and permissions includes an identification of code that accesses the library entries requiring security permissions. The points in the code where library entries are accessed are referred to as library entry points and include calls to the routines contained with the library.

Therefore, in one embodiment the cache includes a correlation between library entry points and required permissions, and the creation of the cache includes an identification, for any libraries upon which the coding being edited is dependent, of the library entry points and a computation of the authorization requirements associated with these library entry points. In one embodiment, the identification and computation of the authorization requirements of the library entry points includes the use of static analysis as described, for example, in U.S. Pat. No. 7,076,804 and U.S. patent application publication no. 2003/0084324. In general, any suitable method for conducting the static analysis known and available to one of skill in the art can be used. In addition, one skilled in the art will be able to perform this computation using an "open world" analysis, including identification of free variables, e.g., unbound parameters, for the library entry points. In one embodiment, identification and computation of the authorization requirements of the library entry points includes the use of a dynamic analysis approach. Suitable methods for dynamic analysis are known and available to one of skill in the art. In general, test cases are created to run against the library entry points. During runtime, security exceptions are trapped and the missing permissions, i.e., authorizations, are recorded and associated with the library entry points. Using the static approach, the dynamic approach or a combination of static and dynamic approaches, a cache is constructed that associates each library entry point for all tested libraries with the security permission requirements identified.

Figure 3:
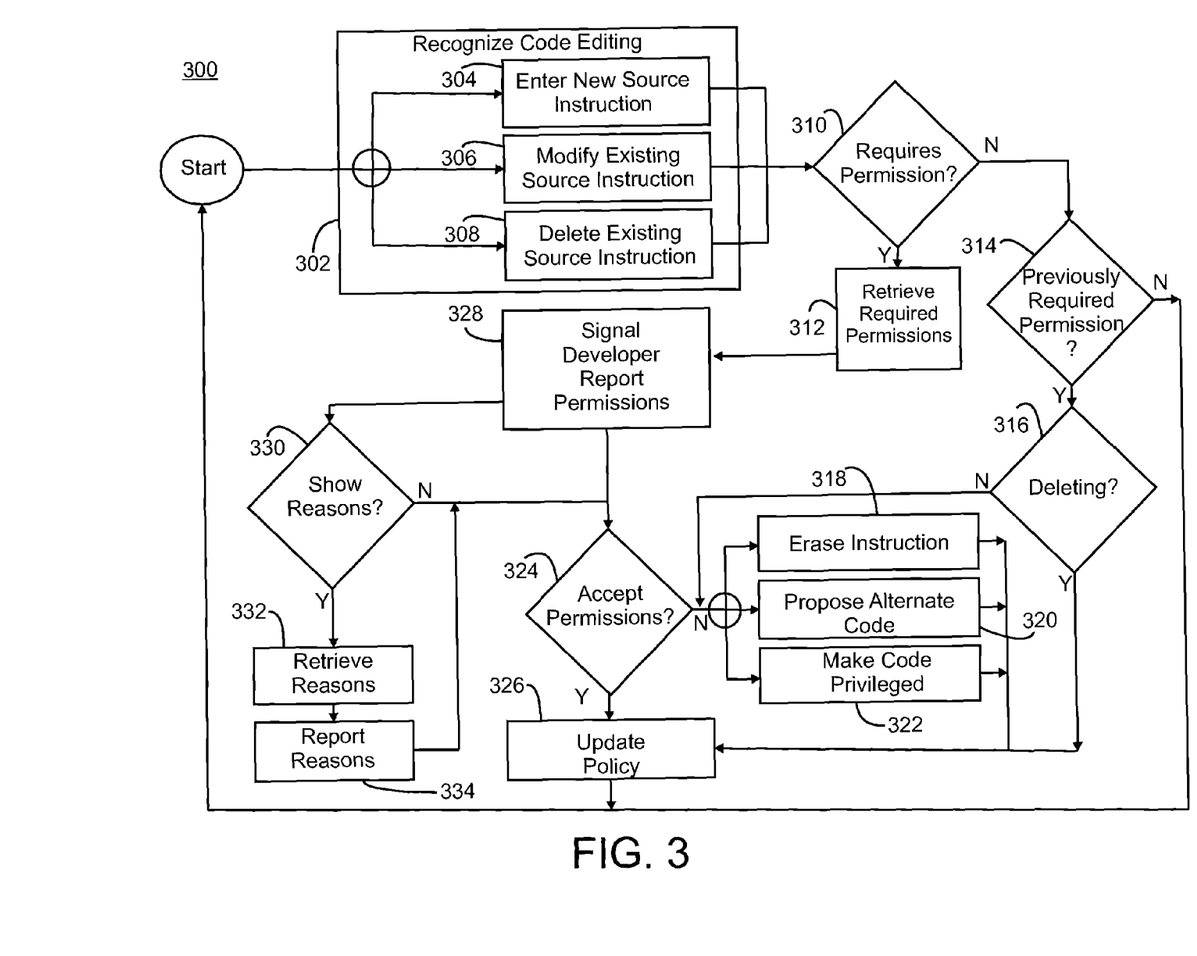
FIG. 3 is a flow chart illustrating an embodiment of a method for automatically determining and presenting security permissions in accordance with the present invention.

Referring to FIG. 3, an exemplary embodiment of the use of the cache to prompt the developer regarding the required security permissions 300 is illustrated. The editing of code is monitored or recognized 302. This includes monitoring the entry of new source code instructions 304, the modification of existing source code instructions 306 and the deletion of existing source code instructions 308. Any suitable method for identifying code edits can be used. When the code includes the use of libraries, editing includes the editing or modification of a library client, e.g., an application or another library, and the code containing calls to library entry points are identified. Suitable methods for identifying calls to the library entry points contained in the cache are known to one of skill in the art and include, but are not limited to, using an abstract syntax tree representation.

As code is being edited by the software developer, the new code, modified code or deleted code is identified, and a check is made regarding whether the edits to the code are associated with functions or calls to libraries that require new or additional security permissions 310. If new permissions are not required, then a determination is made regarding whether or not permissions were previously required by the section of code being edited 314. If previous permissions were not required, then the process returns to the beginning and resumes monitoring for additional code edits. If the edited section of code had previously required security permissions, then a determination is made regarding whether or not to remove or to delete these permissions 316. Removal of the permissions can be based, for example, on a removal of the code or library calls requiring the permissions or a modification of the code to obviate the need for security permissions. If previously required and existing permissions are removed, the security policy is updated accordingly 326. If the existing permissions are not deleted, then the newly entered or modified code can be erased 318, alternative code can be proposed 320 or the newly entered code can be made privileged 322. Again, the security policy is updated accordingly to take into account any of these actions.

When the edits to code made by the developer require new security permissions, then the appropriate or required permissions are retrieved from the cache 312. The developer is signaled or notified about the need for the additional security permissions, and the proposed permissions or pre-defined functions for handling the proposed permissions are displayed to the developer 328 in accordance with the present invention as described above. The developer is provided with the ability to request additional information about the need for the new permissions 330, for example a request to show the reasons why permissions are required. If the developer decides to request additional information, the additional information, for example the reasons for the required permissions or the contents of the displayed functions, are retrieved 332 from the cache and reported or displayed to the developer 334. Following display of the addition information or in the alternative, if additional information was not requested, the developer determines whether or not to select and accept the reported permissions or functions 324. If the permissions or functions are accepted, then the security policy is updated accordingly 326, and the system returns to monitoring for future edits. If the permissions presented to the developer are not accepted, then the developer can chose one of several options. These options can be included in the pre-defined, displayed functions. The newly entered or modified code can be erased 318, alternative code can be proposed 320 or the newly entered code can be made privileged 322. Again, the security policy is updated accordingly to take into account any of these actions.

In one embodiment, additions to and deletions from the permissions associated with the code are propagated up through the nodes in the program graph for the code being edited. For example, using techniques known to those skilled in the art, new permission requirements are either added to or removed from the calling methods and functions of other nodes as these permission requirements are either added or removed for methods under development, i.e., for the code being edited. In a preferred embodiment, this propagation of the permission requirements is accomplished using a fixed point algorithm. Suitable fixed point algorithms are known and available to those of skill in the art.

In addition to propagating changes in permission requirements through the tree, the cache can be updated to reflect changes to the permission requirements associated with code or libraries entries. For example, as permission requirements are added to or removed from library entries, the permission requirements for the entry points to these library entries are similarly modified to reflect the updated permission requirements of callers to the modified library entries.

In one embodiment, it may not be desirable to give the code or a user a permission required to perform a given function generally; however, it is desirable for the code or user to be allowed to perform a function requiring the permission for a specific or limited purpose. Therefore, the code is not provided with the require permission but is made privileged for the purpose of accomplishing the specific purpose. For example, during editing of a library client, e.g., an application or another library, calls to methods or functions requiring permissions may be wrapped in calls that do not require permissions or that already have the required permission to make the wrapped functions "privileged". Suitable methods for identifying when such edits occur are known and available to those skilled in the art and include using an abstract syntax tree representation. When wrapping of the code occurs to make that code privileged, the permission requirement is removed from the entry point to the method being edited. In addition, the propagation of that permission is removed from callers of the current method.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for associating security permissions with program code in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for associating security permissions with program code, the method comprising:
    creating a cache portion of memory comprising a plurality of computer executable code segments and a plurality of security permissions, each security permission associated with at least one of the plurality of computer executable code segments;
    identifying changes being made by a programmer to a computer program code automatically at the time these changes are being made that involve one of the computer executable code segments contained in the cache portion of memory;
    retrieving security permissions from the cache portion of memory automatically that are associated with the identified computer executable code segment that is involved in the edits to the computer program code; and
    presenting to the programmer while making the changes involving the identified computer executable code segment and before runtime of the identified computer executable code segment a list of the retrieved security permissions and programmer-selectable pre-defined functions, the pre-defined functions selectable by the programmer and comprising accepting one or more of the retrieved security permissions, modifying the computer executable code segment to apply the accepted and retrieved security permissions to the computer executable code segment, accepting one or more of the retrieved security permissions with programmer defined modifications, modifying the computer executable code segment to apply the modified and accepted retrieved security permissions, and rejecting the retrieved security permissions
wherein the step of creating the cache portion of memory further comprises:
    identifying code libraries utilized by the changed computer program code;
    identifying library entries within the identified libraries that require security permissions; and
    identifying library entry points associated with the identified library entries that require security permissions, the computer executable code segments comprising the library entry points.

2. The method of claim 1, wherein the step of creating the cache portion of memory further comprises
    using a static analysis tool on each one of the plurality of computer executable code segments to determine required security permissions associated with the computer executable code segments.

3. The method of claim 1, wherein the step of creating the cache portion of memory further comprises using a dynamic analysis tool on each one of the plurality of computer executable code segments to determine required security permissions associated with the computer executable code segments.

4. The method of claim 1, wherein the library entry points comprise calls to the library entries or application program interfaces.

5. The method of claim 1, wherein the code libraries comprise statically linked libraries, dynamically linked libraries or combinations thereof.

6. The method of claim 1, wherein the cache portion of memory comprises persistent storage or non-persistent storage.

7. The method of claim 1, wherein the step of identifying changes to the computer program code involving one of the computer executable code segments comprises identifying an addition of one of the computer executable code segments to the computer program code, identifying a modification of an existing computer executable code segment in the computer program code or identifying a deletion of a computer executable code segment from the computer program code.

8. The method of claim 1, wherein:
the method further comprises determining any changes to security permission requirements caused by the identified changes involving the computer executable code segment; and
the step of presenting the pre-defined functions further comprises presenting the pre-defined functions for processing the retrieved security permissions in accordance with the changes on the security permissions caused by the changes.

9. The method of claim 1, wherein the step of presenting the pre-defined functions further comprises displaying the pre-defined functions in an interactive graphical user interface.

10. The method of claim 9, wherein the interactive graphical user interface comprises the pre-defined functions and additional information associated with the pre-defined function.

11. The method of claim 10, wherein the additional information comprises explanations regarding requirements for and effects of the presented pre-defined functions.

12. The method of claim 1, wherein the pre-defined functions further comprise application of the retrieved security permissions to a security policy associated with the computer executable code, creation of privileged code blocks in the computer executable code or suppression of the retrieved security permissions.

13. The method of claim 1, further comprising automatically applying the retrieved security permissions to the computer program code.

14. The method of claim 1, wherein:
the method further comprises monitoring changes to the computer program code in real time; and
the step of identifying changes further comprises identifying all monitored changes involving one of the computer executable code segments contained in the cache portion of memory.

15. The method of claim 1, further comprising making the code privileged.

16. A non-transitory computer-readable medium containing a computer-readable code that when executed by a computer causes the computer to perform a method for associating security permissions with program code, the method comprising:

creating a cache portion of memory comprising a plurality of computer executable code segments and a plurality of security permissions, each security permission associated with at least one of the plurality of computer executable code segments;
identifying changes being made by a programmer to a computer program code automatically at the time these changes are being made that involve one of the computer executable code segments contained in the cache portion of memory;
retrieving security permissions from the cache portion of memory automatically that are associated with the identified computer executable code segment that is involved in the edits to the computer program code; and
presenting to the programmer while making the changes involving the identified computer executable code segment and before runtime of the identified computer executable code segment a list of the retrieved security permissions and programmer-selectable pre-defined functions, the pre-defined functions selectable by the programmer and comprising accepting one or more of the retrieved security permissions, modifying the computer executable code segment to apply the accepted and retrieved security permissions to the computer executable code segment, accepting one or more of the retrieved security permissions with programmer defined modifications, modifying the computer executable code segment to apply the modified and accepted retrieved security permissions, and rejecting the retrieved security permissions
wherein the step of creating the cache portion of memory further comprises:
identifying code libraries utilized by the changed computer program code;
identifying library entries within the identified libraries that require security permissions; and
identifying library entry points associated with the identified library entries that require security permissions, the computer executable code segments comprising the library entry points.

17. The non-transitory computer-readable medium of claim 16, wherein the step of creating the cache portion of memory further comprises using a static analysis tool on each one of the plurality of computer executable code segments to determine required security permissions associated with the computer executable code segments.

18. The non-transitory computer-readable medium of claim 16, wherein the step of creating the cache portion of memory further comprises using a dynamic analysis tool on each one of the plurality of computer executable code segments to determine required security permissions associated with the computer executable code segments.

19. The non-transitory computer-readable medium of claim 16, wherein the step of presenting the pre-defined functions further comprises displaying the pre-defined functions in an interactive graphical user interface.

20. The non-transitory computer-readable medium of claim 19, wherein the interactive graphical user interface comprises the pre-defined functions and additional information associated with the pre-defined functions.

21. A method for associating security permissions with program code, the method comprising:
creating a cache portion of memory comprising a plurality of computer executable code segments and a plurality of security permissions, each security permission associated with at least one of the plurality of computer executable code segments;

identifying changes being made by a programmer to a computer program code automatically at the time these changes are being made that involve one of the computer executable code segments contained in the cache portion of memory;

determining any changes to security permission requirements caused by the identified changes involving the computer executable code segment;

retrieving security permissions from the cache portion of memory automatically that are associated with the identified computer executable code segment that is involved in the edits to the computer program code; and presenting to the programmer while making the changes involving the identified computer executable code segment and before runtime of the identified computer executable code segment a list of the retrieved security permissions and programmer-selectable pre-defined functions in accordance with the changes on the security permissions caused by the changes, the pre-defined functions selectable by the programmer and comprising accepting one or more of the retrieved security permissions, modifying the computer executable code segment to apply the accepted and retrieved security permissions to the computer executable code segment, accepting one or more of the retrieved security permissions with programmer defined modifications, modifying the computer executable code segment to apply the modified and accepted retrieved security permissions, and rejecting the retrieved security permissions.

\* \* \* \* \*